United States Patent [19]

Best et al.

[11] Patent Number: 5,635,262

[45] Date of Patent: Jun. 3, 1997

[54] HIGH MOLECULAR WEIGHT HIGH DENSITY POLYETHYLENE WITH IMPROVED TEAR RESISTANCE

[75] Inventors: Steven A. Best, Houston, Tex.; Thomas S. Daniluk, Barrington, Ill.

[73] Assignee: Exxon Chemical Patents Inc., Wilmington, Del.

[21] Appl. No.: 354,393

[22] Filed: Dec. 12, 1994

[51] Int. Cl.$^6$ .................... B32B 1/08; C08L 23/06
[52] U.S. Cl. ................ 428/36.92; 428/218; 428/523; 525/240
[58] Field of Search .................. 428/218, 36.92, 428/523; 525/240

[56] References Cited

U.S. PATENT DOCUMENTS

| | | | |
|---|---|---|---|
| 3,919,358 | 11/1975 | Batiuk et al. | 525/211 |
| 4,493,923 | 1/1985 | McCullough, Jr. | 525/88 |
| 4,770,912 | 9/1988 | Furrer et al. | 428/35 |
| 4,911,985 | 3/1990 | Jenkins et al. | 428/446 |
| 5,071,686 | 12/1991 | Genske et al. | 525/240 |
| 5,110,685 | 5/1992 | Cross et al. | 428/494 |
| 5,153,039 | 10/1992 | Porter et al. | 428/446 |
| 5,254,617 | 10/1993 | Inoue et al. | 428/218 |
| 5,338,589 | 8/1994 | Böhm et al. | 428/36.9 |

FOREIGN PATENT DOCUMENTS

| | | |
|---|---|---|
| 0 310 051 A2 | 4/1989 | European Pat. Off. . |
| 0 339 990 A3 | 11/1989 | European Pat. Off. . |
| 0 517 222 A3 | 12/1992 | European Pat. Off. . |
| 0 545 181 A1 | 6/1993 | European Pat. Off. . |
| 829148 | 2/1960 | United Kingdom . |
| 2 007 685 A | 5/1979 | United Kingdom . |
| WO91/17900 | 11/1991 | WIPO . |
| WO91/19763 | 12/1991 | WIPO . |

*Primary Examiner*—Mark D. Sweet
*Attorney, Agent, or Firm*—Douglas W. Miller

[57] ABSTRACT

Articles fabricated from certain high molecular weight high density polyethylenes (HMW-HDPE) combined with a second component, exhibit superior puncture propagation tear resistance and puncture propagation tear length. The second component may be an elastomer such as styrene-butadiene-styrene, styrene-isoprene-styrene, EPR, EPDM, butyl rubber, metallocene-catalyzed polyethylene, and combinations thereof. The second component or components will be present in a fabricated article from 1 to 15 weight percent. Articles include films, bags made from films, and extrusion blow-molded articles.

7 Claims, No Drawings

HIGH MOLECULAR WEIGHT HIGH DENSITY POLYETHYLENE WITH IMPROVED TEAR RESISTANCE

TECHNICAL FIELD

This invention relates generally to high molecular weight high density polyethylene compositions with improved physical properties. More specifically this invention relates to high molecular weight (HMW) high density polyethylene (HDPE) that when combined with a second component and made into a film or a container will exhibit improved puncture propagation tear resistance improved puncture propagation tear length. Such can result in improved impact strength and improved tensile strength.

BACKGROUND

Linear polyethylenes in general, and high density polyethylenes in particular, and high molecular weight high density polyethylenes more particularly, have gained wide use, for instance, as grocery (shoppers) retail sacks (also known as tee-shirt bags) and extrusion blow molded bottles or containers. However one of the problems that has continued to be bothersome in most of these applications is the linear high density polyethylene material's tendency to be "splitty". This splittiness is generally thought to be due to the fact that a linear high density polyethylene has very few branches, certainly few, if any, long chain branches off of the polymer back bone. Such branching might permit entanglement which could, in certain instances, prevent a tear from being propagated once initiated, and/or retard the growth of a tear. Accordingly, once a tear or puncture is initiated in such substantially linear polyethylenes, if there is a load on the polyethylene film, a bag made from the film, or a container it will tend to "zipper" or split at a rapid rate causing failure of the bag and possible evacuation and damage of the contents.

Many approaches to solving this zippering or splittiness problem have been attempted. Usually the inclusion of an amount, for instance 5 to 10 weight percent of linear low density polyethylene (density in the range of from about 0.915 to about 0.930 g/cm$^3$) has been moderately successful perhaps due to the branching provided by the LLDPE(more branching in general is observed for LLDPE than HDPE). The linear low density polyethylene (LLDPE) while providing some improvement in dart drop impact and puncture propagation tear also causes unacceptable stretching or elongation at or near the heat seal under an applied load. Such stretching can cause a bag, for instance a heavily laden grocery bag, to deform generally rendering the bag unacceptable, or at least less functional for its intended purpose.

Conventional low density polyethylene (LDPE) has been blended with HMW HDPE and also gives some relief from the splitting or zippering problem, but again, bags made from films based on such a blend are generally unacceptably stretchy as well.

However, while both of these solutions to the splitting problem are used in the industry, both of these solutions present an inherent difficulty. That difficulty is that the HMW-HDPE is relatively high in melt viscosity while in general, both LDPE and LLDPE are relatively much lower in melt viscosity. This leads to inhomogeneity in the melt and in the resulting film, leading to areas of good performance and areas of poor performance, which is a similarly unacceptable solution to the zippering problem. Attempts to homogenize such a mixture to improve the dispersion, thereby improving the overall physical properties have generally met with poor success as well, because while getting the lower viscosity materials more uniformly dispersed, the higher molecular weight or higher viscosity materials (HMW-HDPE) tend to be subjected to heat and sheer causing some cross-linking and thereby a generally unacceptable diminution of bulk film properties.

Ways to gauge the improvement or lack of improvement in tear properties include standard tests in the film industry such as tear or Elmendorf tear, where generally a nick or cut is placed in the film to be tested. While these tests are of value in HDPE film testing, a more realistic commercial indicator of film properties, especially for HMW-HDPE, is the puncture propagation tear (PPT) and the puncture propagation tear length (PPTL). These two tests are indicative of a tear that would be similar to one initiated in an everyday situation by the puncture of a film, or a bag based on the film, and the subsequent length of the tear for a specific puncture.

Another way to improve the tear and puncture propagation tear properties of an HMW-HDPE material might be to extrude, adjacent to the HDPE, for instance in a coextrusion, a more highly branched polymer material. This, however, is a more expensive method of solving this problem and is therefore generally commercially unacceptable.

Also, in the category of solutions to the tear problem, are certain machine or extruder manipulations that can improve the tear strength. Because of the very high melt strength of HMW-HDPE, the film is generally fabricated using a high stalk configuration. This configuration allows for the melt to relax prior to blowing up to the full lay-flat width desired for the finished product. To achieve more relaxation which in turn improves tear and impact properties, film fabricators attempt to maximize the stalk height and the blow-up ratio. Typically the stalk height is six to eight times the die diameter and the blow-up ratio ranges from three to five times the die diameter. These parameters are limited by the stability of the bubble at reasonable production rates.

U.S. Pat. No. 5,110,685 discloses blends of high density polyethylene with elastomers to produce low friction, abrasion resistant coatings. Specifically this document discloses a multi part blend:

a) a high density PE blend of
  i) high molecular weight HDPE present from about 10 to 80 percent by weight;
  ii) medium molecular weight HDPE present from about 20 to 70 percent by weight; and
  iii) low molecular weight HDPE making up the balance of the HDPE blend;

b) an EPDM elastomer.

Various blends of a) and b) with carbon black and optionally talc, are tested to determine their abrasion resistance and, as a measure of low friction, the coefficient of friction. Such a blend of different MW HDPEs would yield a film that would generally be unsuitable for consumer bags because of dilution of the MW of HMW-HDPE products generally leads to reduced impact properties. This phenomenon is well known to those of ordinary skill in the art regarding performance of medium MW products relative to performance of HMW products. Dart impact (another important physical property of films) of medium MW properties are typically 50 % less than those achieved from HMW based products.

There is therefore a need to produce a high molecular weight high density polyethylene film that can be fabricated into, for instance, tee-shin bags, that have superior resistance to puncture propagation tear and improved puncture propagation tear length and are generally commercially practicable from an economic and fabrication standpoint.

SUMMARY

With the present invention, and in particular with a preferred embodiment, the above mentioned problems are substantially overcome resulting in an article fabricated from a HMW-HDPE composition that has superior puncture propagation tear resistance, superior puncture propagation tear length, and improved J-tear. The HMW-HDPE composition will include a majority component (HMW-HDPE) and a minority component (a material to improve tear properties). When well dispersed, such a minority component will generally be useful in improving these test results.

In accordance with an embodiment of the present invention, we provide a film (and/or an extrusion blow molded article) comprising (a) in the range of from about 85 to about 99 weight percent of a HMW-HDPE (first component) having a density in the range of from about 0.940 to about 0.970 g/cc, the HMW-HDPE will be either a homopolymer or a copolymer. If it is a copolymer, generally it will be a copolymer of ethylene and an alpha-olefin. The alpha-olefin content will be present up to about 2 mole percent based on the total moles of the HMW-HDPE, said HMW-HDPE having a melt index in the range of from about 0.02 to about 1.0 dg/min.; and (b) in the range of from about 1 to about 15 weight percent of a second component selected from the group consisting of styrene-butadiene-styrene (SBS), styrene-isoprene-styrene (SIS), ethylene-propylene rubber (EPR) ethylene-propylene-diene-monomer rubber (EPDM), butyl rubber, a metallocene-catalyzed LLDPE and combinations thereof; where said film has a PPT (MD) above about 2.0 KgF, a PPT KgF (TD) above about 2.2, a PPTL (TD) below about 92 mm and a PPTL (MD) up to about 100 mm.

Preferably the film will have in the range of from about 90 to about 99 weight percent of an HMW-HDPE and in the range of from about 10 to about 1 weight percent of the second component. More preferably, the film will have in the range of from about 93 to about 99 weight percent of HMW-HDPE, and in the range of from about 1 to about 7 weight percent of the second component, all weight percentages based on the total weight of the composition.

These and other features, aspects, and advantages of the present invention will become better understood with reference to the following description and appended claims.

DESCRIPTION OF THE PREFERRED EMBODIMENTS

In an embodiment of our invention, certain HMW-HDPE compositions and applications based on these compositions are disclosed. These polyethylene compositions have unique properties which make them particularly well suited for use in applications that require resistance to puncture propagation tear and improvement of puncture propagation tear length in films and impact strength and tensile strength in extrusion blow molded articles. These compositions have combinations of properties that render them superior to compositions previously available for many uses such as tee-shirt shoppers bags, retail bags, produce bags, extrusion blow molded articles and other uses known to those of skill in the art.

Following is a detailed description of certain preferred HMW-HDPE compositions within the scope of an embodiment of the present invention, preferred methods of producing these compositions and preferred applications of these compositions. Those skilled in the art will appreciate that numerous modifications of these preferred embodiments can be made without departing from the scope of our invention. For example, although the properties of the composition are exemplified in film applications, they have numerous other uses. To the extent, our description is specific, this is solely for the purpose of illustrating preferred embodiments of our invention and should not be taken as limiting the present invention to these specific embodiments. Values given in the text and claims are determined as follows; using ASTM test methods of common use to measure film performance;

Dart Drop Impact: ASTM D-1709

Tensile Strength: ASTM D-882

Elmendorf Tear (MD and TD): ASTM D 1922

Elongation: ASTM D 882

Puncture Propagation Tear: ASTM D 2582-93

PP Tear Length (mm) MD and TD: ASTM D-2582-93

HMW-HDPE Resin

The polyethylene composition of an embodiment of the present invention for use in film or extrusion blow molded articles may be made from an ethylene homopolymer or ethylene copolymer or a blend of an ethylene copolymer with an ethylene homopolymer. The density of the preferred materials are generally in the range of from about 0.940 to 0.970 g/cc. In a preferred embodiment the density ranges from about 0.948 to 0.965 g/cc. More preferred density in the range of from about 0.950 g/cc to about 0.960 g/cc. The HMW-HDPE will have a melt index as measured according to the ASTM D-1238 in the range of from about 0.02 to about 5 dg/min. Preferably the melt index will be in the range of from about 0.02 to about 1 dg/min., most preferred 0.03 to 0.1 dg/min. If the ethylene polymer is a copolymer it will be generally an ethylene alpha-olefin copolymer, the alpha-olefin utilized to make the copolymer will be selected from the group consisting of butene-1,pentene-1,4-methyl-1-pentene, hexene-1, and octene-1. The alpha-olefin will be present in the copolymer in the range of up to about 2 moles/mole of copolymer.

The HMW-HDPE may be made by a number processes including but not limited to gas phase, fluidized bed, slurry or solution processes. Catalysts used for polymerization are generally selected from the traditional Ziegler-Natta type, zirconium-type or metallocene-type catalyst systems. Such catalysts and their products are well known.

Second Components

The second component may be chosen from the group consisting of SBS, SIS, EPR, EPDM, butyl rubber, metallocene-catalyzed LLDPEs, and combinations thereof. Preferred are the SBS elastomers or the metallocene-catalyzed LLDPEs. SBS and SIS materials are available, for instance, from Dexco Corporation under the trade name Vector®. The approximate physical properties of these SBS elastomers are as follows:

Melt flow rate (ASTM D-1238) @ 200° C., 15 Kg=20 to above 0.1, preferred 12 to above 0.1 dg/min., more preferred 8 to above 0.1 dg/min.

Molecular weight (weight average molecular weight) 20,000 to 100,000 preferred 40,000 to 100,000, more preferred 80,000 to 100,000. Styrene content in the range of from about 10 to 50 percent, preferably, in the range of from about 20 to about 40 percent, more preferably in the range of from about 25 to about 35 percent. EPR, EPDM and butyl rubber are well known polymers and are widely available from a number of commercial sources.

Where the second component is a metallocene-catalyzed LLDPE the specific resin chosen optionally will have a melt index below about 2 dg/min., and a density in the range of from about 0.915 to about 0.925 g/cc. In any case, the choice of a second component, as recognized by those of ordinary skill in the art, will be controlled in that substantially no diminution of the end product properties occur.

The Polyethylene Film Composition

The composition of the film in a preferred embodiment of the present invention, has in the range of from about 85 to 99 weight percent of an HMW-HDPE polyethylene and in the range of from about 1 to about 15 weight percent of a second component selected from the group consisting of SBS, SIS, EPR EPDM, butyl rubber, metallocene-catalyzed LLDPE, and combinations thereof. Preferably the HMW-HDPE will be present in the range of from about 90 to about 99 weight percent and the second component will be present in the range of from about 10 to about 1 weight percent. More preferably, the HMW-HDPE will be present in the range of from about 93 to about 97 weight percent and elastomer will be present in the range of from about 7 to about 3 weight percent. All weight percents based on the total weight of the film composition. If the second component is employed in the blend excess of about 15% by weight, the film will still have useful properties, but the expense of such a quantity of second component in the blend will likely make the resulting fabricated product too expensive to be commercially viable, or the properties of the film would make it generally unsuitable for shopper's bags and the like. At less than about 1 percent by weight, the positive effect of the second component on the properties of the bulk fill will diminish below a generally beneficial point.

In certain embodiments of the present invention, additives of the type normally used to inhibit oxidation, U-V inhibitors, acid scavengers, U-V absorbers, anti-static materials, colorants, slip agents, and the like may be included in the bulk film composition without substantially changing the desirable properties described in the present application.

Uses of the Film

There are many uses for films made from compositions representing certain embodiments of our invention. Various kinds of bags are one such use. Among bags there are many types as well such as grocery bags, often called "tee-shirt bags", general merchandise bags, bags used to line refuse containers (industrial, commercial and residential) (commonly known as "can liners"), and the like. Those of ordinary skill in the art will recognize that the nominal thickness of a film, bag or other article will have an effect on some gross mechanical properties of the article. Grocery sacks generally are made in nominal 0.5 mil (12.7 μm) thickness. Thicker cross sections would likely result in higher puncture force even without the teachings of our invention. Application of the teachings of our invention to such thicker cross section will generally further improve puncture force, PPT and PPTL.

Evaluation of Film Materials

In the evaluation of polymer films in general, many parameters are of importance. However, in the evaluation of linear polyethylene, more specifically high molecular weight high density polyethylene films, the measurements of importance to manufactures of shoppers' bags, retail bags and can liners will be; dart drop impact, which is generally a measure of the mount of force taken to burst a specific thickness of film, in grams; the Eimendorf tear which is an indication of the materials' ability to resist tear; and the TD/MD tear ratio is useful as an indicator of orientation balance. Generally, films with a lower TD/MD ratio, indicative of improved tear with better balance, tend to be less splitty than those with higher ratios.

However, in high molecular weight high density polyethylene films, a test that approximates real world performance where sharp and/or heavy objects may be contained in a film or a bag made from a film, the puncture propagation tear in kilograms of force in both the machine and transverse directions (MD and TD) is an important measurement. Films which require greater force to tear tend to be less splitty and have more of a J-tear character. J-tear refers to that type of tear which results in the film not tearing in a straight line, but one in which the tears make a sharp turn and changes direction and resembles the letter "J". This is particularly critical in shopper's bags since straight line tears often lead to catastrophic failure. These results compliment tear properties measured by the Elmendorf tear test. A further refinement of the puncture propagation tear test is the puncture propagation tear length under a given set of conditions. This will be an indication of whether or not a specific film not only has a resistance to puncture propagation tear, but under given conditions how far such a tear will propagate.

EXAMPLES

Examples 1–5

This set of examples demonstrates that in the extrusion of HMW-HDPE into film, certain second components (minority components) blended into the HMW-HDPE will yield a film with a dramatic improvement in PPT and PPTL over an HMW-HDPE without any additives (except for stabilizers, anti-oxidants, and the like). The minority component blends also show an improvement over blends of HMW-HDPE with more traditional blend partners, such as LLDPEs.

All runs were made on an Alpine extruder with a 160 mm (coextrusion die) equipped with internal bubble cooling (IBC) having a die gap of 1.5 mm. Blowup ratio was 4.7, stalk height ratio 6. Film gauge averaged a nominal 0.5 mils (13 μm). Example parameters and film physical properties are shown in Table 1.

Example 1 was performed using an HMW-HDPE Grade 7000 F (available from Exxon Chemical Co.) which is a bimodal HMW-HDPE with a density of 0.952 g/cc, and a MI of 0.04 dg/m.

In Example 2, 5 weight percent of the HMW-HDPE was replaced with a 1.0 MI, 0.918 g/cc density LLDPE (traditional Ziegler-Natta catalyzed) (Grade LL-1001 available from Exxon Chemical Co.)

In Examples 3 and 4, 5, and 10 weight percent respectively of the HMW-HDPE was replaced with a 1.0 MI, 0.918 g/cc density metallocene-catalyzed LLDPE available from Exxon Chemical Co.

In example 5, 5 weight percent of the HMW-HDPE was replaced with Vector® 8508 (available from Dexco Polymers).

In comparing the substantially 100 percent HMW-HDPE (Example 1) and the 95 percent HMW-HDPE, 5 percent Ziegler-Natta catalyzed LLDPE (Example 2) with Examples 3 and 5 (5 weight percent metallocene-catalyzed LLDPE and 5 weight percent Vector SBS respectively), the following observations on specific physical properties are made:

MD/TD ratio; while an improvement of 60+% is observed from Example 1 to Example 2, a ±300% improvement is observed from Example 1 to Examples 3 or 5;

PPT MD; substantially no difference is observed between Examples 1 and 2, but a 20 percent improvement is observed between Example 1 and Examples 3 or 5;

PPTL MD; a slight decrease is noted from Example 1 to Example 2 while a substantial reduction (±25 percent) comparing Example 1 to Examples 3 or 5;

PPTL TD; a less than 10 percent reduction is seen Example 2 to Example 1, while a 20+percent reduction is seen Examples 3 or 5 to Example 1.

Although the present invention has been described in considerable detail with reference to certain preferred versions thereof, other versions are possible. For example, while films and bags have been exemplified, other uses such as for instance extrusion blow molding, are contemplated. Therefore, the spirit and scope of the appended claims should not be limited to the description of the preferred versions contained therein.

TABLE 1

| | EXAMPLE 1 | EXAMPLE 2 | EXAMPLE 3 | EXAMPLE 4 | EXAMPLE 5 |
|---|---|---|---|---|---|
| Die diameter (mm) | 160 | 160 | 160 | 160 | 160 |
| Die GAP (mm) | 1.5 | 1.5 | 1.5 | 1.5 | 1.5 |
| Blow-Up Ratio | 4.7 | 4.7 | 4.7 | 4.7 | 4.7 |
| Stalk Height Ratio | 6 | 6 | 6 | 6 | 6 |
| Output Rate (lb/hr) (kg/hr) | 280 (127) | 280 (127) | 280 (127) | 280 (127) | 280 (127) |
| Film Gauge, ave. (mil) (microns) | 0.51 (13) | 0.51 (13) | 0.52 (13) | 0.502 (12) | 0.53 (14) |
| Film Gauge, low (mil) (microns) | 0.42 (11) | 0.42 (11) | 0.38 (10) | 0.37 (10) | 0.31 (8) |
| Film Gauge, high (mil) (microns) | 0.63 (16) | 0.64 (16) | 0.65 (16) | 0.73 (18) | 0.68 (17) |
| Gauge Variation, % | 20.6 | 21.6 | 26 | 35 | 35 |
| Dart Drop (g) | 160 | 160 | 160 | 116 | 158 |
| Dart Drop (g/mil) (g/microns) | 314 (12.3) | 314 (12.3) | 309 (12.3) | 231 (9.7) | 300 (11.3) |
| Elmendorf Tear (g), MD | 7.2 | 7.4 | 5.2 | 4.6 | 4.6 |
| Elmendorf Tear (g/mil) (g/microns), MD | 13.6 (0.55) | 14.8 (0.57) | 9.7 (0.40) | 9.4 (0.38) | 9 (0.33) |
| Elmendorf Tear (g), TD | 35.8 | 64 | 86.8 | 132.2 | 67.6 |
| Elmendorf Tear (g/mil) (g/microns), TD | 71.4 (2.75) | 121.5 (4.92) | 162.9 (6.68) | 254.6 (11.02) | 127.5 (4.83) |
| TD/MD Ratio | 5 | 8.6 | 16.7 | 28.7 | 14.7 |
| Tensile @ Yield (psi) (MPa), MD | 5720 (39.8) | 5542 (38.6) | 6166 (42.9) | 5206 (36.2) | 6133 (42.7) |
| Tensile @ Yield (psi) (MPa), TD | 4686 (32.6) | 4968 (34.6) | 4797 (33.4) | 4644 (32.3) | 4816 (33.5) |
| Elongation @ Yield (%), MD | 4.8 | 4.99 | 5.1 | 5.1 | 5.3 |
| Elongation @ Yield (%), TD | 4.38 | 4.4 | 4.4 | 4.6 | 4.4 |
| Ultimate Tensile (psi) (MPa), MD | 13552 (94.4) | 13174 (91.7) | 14324 (99.7) | 14416 (100.4) | 15941 (111.0) |
| Ultimate Tensile (psi) (MPa), TD | 9178 (63.9) | 10145 (70.6) | 7690 (53.6) | 7029 (48.9) | 7451 (51.9) |
| Ultimate Elongation (%), MD | 316 | 297 | 226 | 262 | 246 |
| Ultimate Elongation (%), TD | 383 | 416 | 402 | 472 | 327 |
| PPTear (kgF), MD | 1.82 | 1.89 | 2.22 | 2.25 | 2.32 |
| PPTear (kgF), TD | 2.12 | 2.22 | 2.49 | 2.56 | 2.5 |
| PPTear Length (mm), MD | 126.4 | 121.4 | 89.6 | 88 | 83.4 |
| PPTear Length (mm), TD | 97.2 | 90 | 74.2 | 71 | 73.6 |

We claim:

1. A high molecular weight-high density polyethylene composition comprising:
   a) a first component present in the range of from about 85 to 99 weight percent, said first component is an high molecular weight-high density polyethylene said high molecular weight-high density polyethylene having;
      i) a density in the range of from about 0.940 to about 0.970 g/cc;
      ii) an alpha-olefin comonomer content up to about 2 mole percent based on the total moles of the high molecular weight-high density polyethylene;
      iii) melt index in the range of from about 0.02 to about 0.1 dg/min.; and
   b) in the range of from 1 to about 15 weight percent of a metallocene-catalyzed linear low density polyethylene.; and wherein a film made from said composition has a puncture propagation tear, (machine direction) above about 2 KgF, and a puncture propagation tear length, (machine direction) up to about 100 mm.

2. A film made from the composition of claim 1.

3. A bag made from the composition of claim 2.

4. A molded article made from the composition of claim 1.

5. The bag of claim 3, wherein said bag is a tee-shirt bag.

6. A can liner formed from the film of claim 2.

7. An extrusion blow-molded article made from the composition of claim 1.

* * * * *